United States Patent
Lovrien et al.

(10) Patent No.: US 10,409,999 B2
(45) Date of Patent: *Sep. 10, 2019

(54) COMMUNICATION BETWEEN KEY MANAGER AND STORAGE SUBSYSTEM KERNEL VIA MANAGEMENT CONSOLE

(71) Applicant: INTERNATIONAL BUSINESS MACHINES CORPORATION, Armonk, NY (US)

(72) Inventors: Kurt A. Lovrien, Tucson, AZ (US); Richard K. Martinez, Tucson, AZ (US); Oladimeji O. Omoniyi, Tucson, AZ (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 15/398,849

(22) Filed: Jan. 5, 2017

(65) Prior Publication Data
US 2017/0116423 A1    Apr. 27, 2017

Related U.S. Application Data

(63) Continuation of application No. 14/997,653, filed on Jan. 18, 2016, now Pat. No. 9,569,629, which is a
(Continued)

(51) Int. Cl.
*H04L 29/06* (2006.01)
*G06F 21/60* (2013.01)
*H04L 9/08* (2006.01)

(52) U.S. Cl.
CPC .......... *G06F 21/602* (2013.01); *H04L 9/0816* (2013.01); *H04L 9/0819* (2013.01); *H04L 63/06* (2013.01); *H04L 2209/24* (2013.01)

(58) Field of Classification Search
CPC ......... H04L 9/06; H04L 9/08; H04L 63/0428; H04L 63/06; G06F 21/606; G06F 21/71; G06F 21/72; G06F 21/805; G06F 21/602
(Continued)

(56) References Cited

U.S. PATENT DOCUMENTS

| 5,029,206 A | 7/1991 | Marino, Jr. et al. |
| 5,276,735 A | 1/1994 | Boebert et al. |

(Continued)

OTHER PUBLICATIONS

Drebes et al., "A kernel-based communication fault injector for dependability testing of distributed systems," INSPEC, AN-8967560, 2006 (14 pages).
(Continued)

*Primary Examiner* — Hosuk Song
(74) *Attorney, Agent, or Firm* — Griffiths & Seaton PLLC

(57) ABSTRACT

System, computer program product, and method embodiments for communication between a kernel operational on a storage subsystem and a key manager (KM) through a hardware management console (HMC) to provide encryption support are provided. In one embodiment, pursuant to a data request by the kernel to the KM, data including a data payload is sent by the KM to the kernel to provide encryption support, the data payload corresponding to an event flow suborder type selected by the kernel for an event flow.

27 Claims, 3 Drawing Sheets

Related U.S. Application Data continuation of application No. 14/179,298, filed on Feb. 12, 2014, now Pat. No. 9,275,243, which is a continuation of application No. 13/532,431, filed on Jun. 25, 2012, now Pat. No. 8,677,120, which is a continuation of application No. 12/580,140, filed on Oct. 15, 2009, now Pat. No. 8,271,784.

(58) Field of Classification Search
USPC ................ 380/277; 713/150–152, 164–167, 713/189–194; 726/2–4, 26–30; 709/219–220
See application file for complete search history.

(56) References Cited

U.S. PATENT DOCUMENTS

| | | | |
|---|---|---|---|
| 5,530,758 A | 6/1996 | Marino, Jr. et al. | |
| 5,978,578 A | 11/1999 | Azarya et al. | |
| 5,983,350 A | 11/1999 | Minear et al. | |
| 6,473,794 B1 | 10/2002 | Guheen et al. | |
| 6,535,929 B1 | 3/2003 | Provino et al. | |
| 6,704,871 B1 | 3/2004 | Kaplan et al. | |
| 6,738,909 B1 | 5/2004 | Cheng et al. | |
| 7,003,282 B1 | 2/2006 | Ekberg | |
| 7,336,790 B1 | 2/2008 | Caronni et al. | |
| 7,921,286 B2 | 4/2011 | Wooten | |
| 8,271,784 B2 | 9/2012 | Lovrien et al. | |
| 8,341,723 B2* | 12/2012 | Abzarian | H04L 63/0227 713/164 |
| 8,416,954 B1* | 4/2013 | Raizen | H04L 63/0428 380/277 |
| 8,479,013 B2* | 7/2013 | Finlayson | G06F 21/32 713/186 |
| 8,677,120 B2 | 3/2014 | Lovrien et al. | |
| 9,275,243 B2 | 3/2016 | Lovrien et al. | |
| 9,569,629 B2* | 2/2017 | Lovrien | H04L 63/06 |
| 2008/0077909 A1 | 3/2008 | Collins et al. | |

OTHER PUBLICATIONS

Kistler et al., "Continuous Program Optimization," A Case Study, ACM Digital Library, 2003 (49 pages).

Kistler et al., "Automated Data-Member Layout of Heap Objects to Improve Memory-Hierarchy Performance," ACM Digital Library, 2000 (16 pages).

* cited by examiner

KM Event Definition:

```
typedef struct DaKmEventStruct {
  struct DaKmEventAttributes {    /*-Cl event payload for encryption work */
    UINT32 attrSize;   /*-byte size of this structure (variable payload) */
    UINT32 offset2buff; /*-byte offset within DaKmEventStruct of payload */
    PTRV   pTcb;       /*-needed on subOrders for Essni           */
    UINT8  subOrder;   /*-orderType (daEvtOrderTypeCodes)         */
    UINT8  reserved1;  /*-unused byte                             */
    UINT8  hmcId;      /*-primary hmc=0, secondary=1              */
    UINT8  ekmId;      /*-EKM handle is 1 to N (spec says N is 4) */
    UINT32 exchangeId; /*-epoch time at the start of the exchange */
    UINT16 uniqueId;   /*-unique number within the epoch second   */
    UINT16 encryptGroup; /*-the encryption group number           */
    char   machine[12]; /*-serial[5],plant[2],type[4],NULL        */
    UINT8  lpar;       /*-which cec (0 or 1)                      */
    UINT8  reserved2;  /*-unused area                             */
    UINT16 lrc;        /*-lrc for this entire structure           */
    UINT32 reserved3;  /*-unused area                             */
    UINT32 reserved4;  /*-unused area                             */
    union {            /*-should start on a word boundary         */
      UINT32      eData[20]; /*-should be max size of union header */
      DaKmEvtKeyStore keyStore; /*-struct for storing key Repos  */
    } u;
    UINT32 payloadSize; /*-the byte size of kmPayload buffer being used */
    /*-kmPayload is a variable length buffer */
    UINT8  kmPayload[1];
  }attr;
}DaKmEvent;

typedef struct DaKmEvtKeyStore DaKmEvtKeyStore;
struct DaKmEvtKeyStore  {   /*-ctl struct for request/response to DA */
  UINT32   startByte;    /*-byte offset with keyStore           */
  UINT32   byteCount;    /*-byte count of keyStore to transfer */
};
```

Suborder event types:

```
typedef enum daEvtOrderTypeCodes {
    DA_EVT_SUB_CMD_EKM_OPEN      = 0x01, /*-open communication with an EKM*/
    DA_EVT_SUB_CMD_EKM_CLOSE     = 0x02, /*-close all for a given hmc */
    DA_EVT_SUB_CMD_SEND_MSG_TO_EKM = 0x03,
    DA_EVT_SUB_CMD_GET_EKM_PATH_LIST = 0x04,
    DA_EVT_SUB_CMD_BACKUP_KEY_STORE = 0x05,
    DA_EVT_SUB_CMD_PING_ESSNI    = 0x06,
    DA_EVT_SUB_CMD_PING_HMC      = 0x07,
    DA_EVT_SUB_CMD_NOTIFY_DA     = 0x08, /*NI interlock notification */
    DA_EVT_SUB_CMD_DA_ONLY       = 0x0F,
    /*-SNMP Traps which DA can have NI perform to info the customer of problems*/
    DA_EVT_SUB_CMD_EKM_SNMP_TRAP = 0x40 /*-Cust Info: EKM says no match */
}daEvtOrderTypeCodes;
```

FIG. 3

COMMUNICATION BETWEEN KEY MANAGER AND STORAGE SUBSYSTEM KERNEL VIA MANAGEMENT CONSOLE

CROSS-REFERENCE TO RELATED APPLICATION

This Application is a Continuation of U.S. patent application Ser. No. 14/997,653, filed on Jan. 18, 2016, which is a Continuation of U.S. patent application Ser. No. 14/179,298, filed on Feb. 12, 2014 that is now U.S. Pat. No. 9,275,243, which is a Continuation of U.S. patent application Ser. No. 13/532,431, filed on Jun. 25, 2012 that is now U.S. Pat. No. 8,677,120, which is a Continuation of U.S. patent application Ser. No. 12/580,140, filed Oct. 15, 2009 that is now U.S. Pat. No. 8,271,784, the entire contents of each are incorporated herein by reference and is relied upon for claiming the benefit of priority.

BACKGROUND OF THE INVENTION

Field of the Invention

The present invention relates in general to computers, and more particularly to a system and method of communication between components in a storage system.

Description of the Related Art

Computers and computer systems are found in a variety of settings in today's society. Computing environments and networks may be found at home, at work, at school, in government, and in other settings. Computing environments increasingly store data in one or more storage environments apart from the interface that computer users typically associate. In many cases, the storage environments are located across wide area networks (WANs), in which data is sent to/received from a storage system located remotely from the host.

Storage systems provide data redundancy and greater capacity for storage. As data processing and storage needs increase, storage systems are used with greater frequency. Storage systems contain a variety of interconnected components that allow access, control, and communication between a network of storage devices and the host.

SUMMARY OF THE INVENTION

In storage system components such as those in the IBM® DS8000 and DS6000 storage systems, communication between the ESSNI (enterprise storage server network interface) server and the NI (network interface) agent running in each central electronic complex (CEC) of a CEC storage controller is performed via transport control protocol/internet protocol (TCP/IP) sockets. These sockets are opened at startup time, and the connection remains active as long as the NI agent is running. The communication path is bidirectional. The communication path is used to send requests from the ESSNI server to a microcode layer that processes the respective request. Microcode layers use the communication path to send events to ESSNI client applications.

For requests from ESSNI client applications to a microcode layer that will process the request, the NI server will send the request to a device driver/device adapter (DA) using a Kernel Pipe Interface (K-Pipe). The operating system (OS) will receive the request from the driver and forward the request to different microcode layers resident in a respective CEC kernel. For events from a microcode layer to the ESSNI client application that will process the event, the OS will send the event through the Kernel Pipe Interface to the NI agent. The NI agent will then route the event to the ESSNI client application through the communication path.

To provide encryption support in storage systems such as the DS8000 system previously described, the DA kernel level microcode in a respective CEC kernel requires communication with a Key Manager (KM) through a Hardware Management Console (HMC) on which the NI server is operable. From the CEC kernel, the DA has no knowledge or direct communication paths to one or more configured KMs or HMCs. However, in situations such as startup, it is necessary for the DA to establish communication with the KM. In some storage systems, considerations of redundancy result in multiple HMCs/KMs in a particular configuration. Any number of these components may be available at any one time.

In light of the foregoing, a need exists for an efficient system and method of communication whereby a CEC kernel may initiate communications with a KM through a HMC, and whereby configurations of multiple KMs/HMCs may be accessed, to provide data pursuant to encryption support. The system and method should be compatible with existing standards and make use of existing system resources to make an implementation cost-effective and efficient.

Accordingly, various system, computer program product, and method embodiments for communication between the CEC kernel and the KM through a HMC are provided. In one such embodiment, by way of example only, pursuant to a data request by the kernel to the KM, data including a data payload is sent by the KM to the kernel to provide encryption support, the data payload corresponding to an event flow suborder type selected by the kernel for an event flow.

Additional exemplary system, method, and computer program product embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is exemplary program code illustrating a definitional structure and suborder event types for one embodiment of the present invention.

DETAILED DESCRIPTION OF THE DRAWINGS

The illustrated embodiments provide an efficient, novel event type (having multiple sub-event types). This event type facilitates a data flow initiated and driven by the CEC kernel (specifically the DA-KM module operable on the kernel) to communicate with an applicable external KM through a HMC's NI to provide encryption support. Once communication is established, a data request made by the kernel to the KM results in the delivery of a data payload.

This data payload may include session key information sufficient for the kernel to operate, for example. The data and corresponding data payload may vary according to the data request of the kernel and the particular event suborder type selected by the KM to provide encryption support. The NI receives the initiated event from the kernel, and facilitates communication to a particular KM, but retains no knowledge about the event flow. Because the NI is not obligated to retain such information, the overall design, structure and execution of the event type are simplified.

Figure 1:
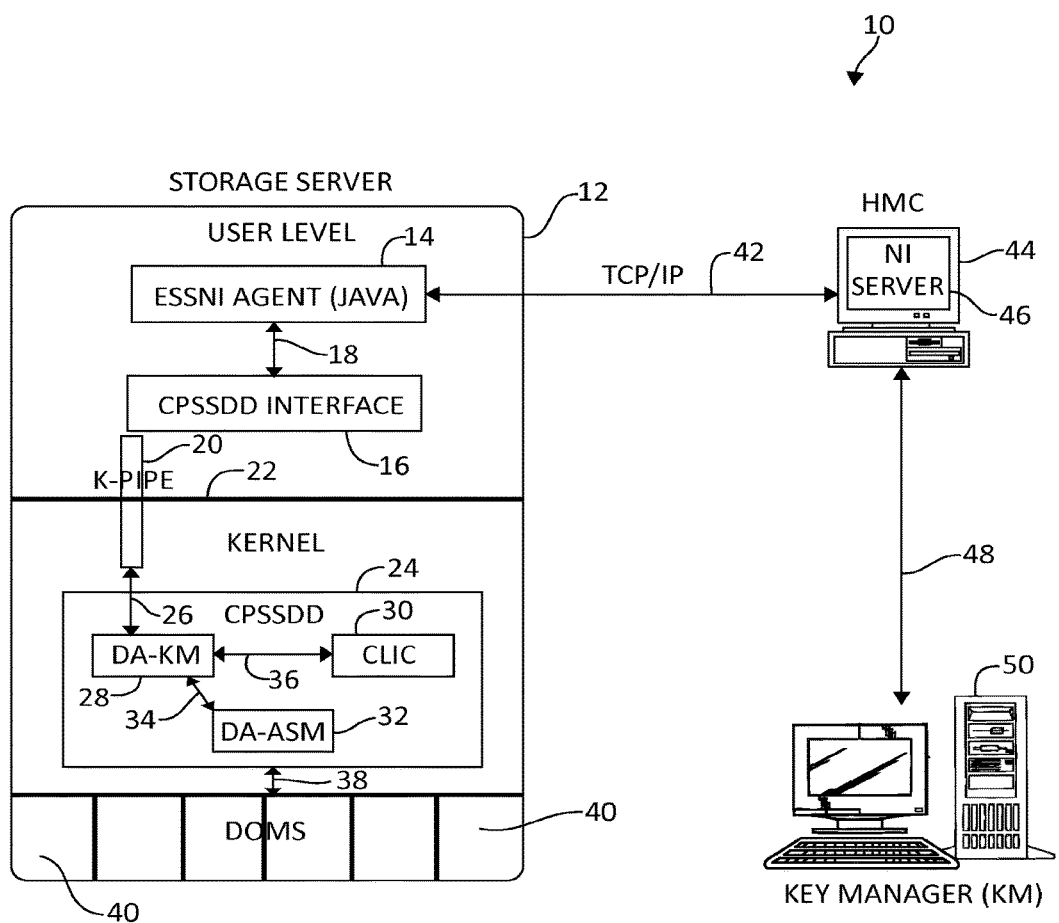
FIG. 1 is a block diagram of an exemplary computing environment in which certain aspects of the present invention may be implemented.

FIG. 1 is a block diagram of a portion of a data storage system 10 in which the present invention may be implemented. The data storage system 10 includes a storage controller or server 12. One of ordinary skill in the art will appreciate that in additional embodiments, additional storage servers 12 may be implemented. Storage server 12 includes attached data storage devices 40. Other storage devices may also be attached to the storage server 12. In one embodiment, the storage server 12 may be an IBM® Enterprise Storage Server 12 and includes a processor, memory, and counters as well as appropriate network interfaces as one of ordinary skill in the art will anticipate. The processor is programmed with instructions stored in the memory for managing I/O operations requested by host devices as well as for computing network I/O performance statistics. The storage devices 40 may be any type of removable or fixed physical storage including, without limitation, electronic memory (such as RAM or solid state memory), hard disks, RAID arrays, tape cartridges, optical discs and other media. Removable media may be (but need not be) contained with an automated data storage library.

Kernel 22 is operable on storage server 12 as shown. Kernel 22 includes a CPSSDD module 24 inclusive of a DA-KM module (a subcomponent of the DA) 28, a CLIC module 30, and a DA-ASM module 32, providing device adapter control and interface functionality between storage devices 40 collectively shown as a grouping of disk drive modules (DDMs). Intercommunication between the CLIC module 30 and the DA-KM module 28 is shown by arrow 36. Similarly, intercommunication between the DA-ASM module 32 and the DA-KM module 28 is shown by arrow 34. The DA-ASM module 34 provides communication between the CPSSDD module 24 and the grouping of DDMs 40 as shown by arrow 38. In one embodiment, modules 24, 28, 30, and 32 may be implemented in whole, in part, or associated in various ways with microcode and/or microcode layers in the kernel 22. The microcode layers are used in conjunction with the kernel 22 to execute tasks, provide communication, interface with other components, and the like as one of ordinary skill in the art will appreciate.

CPSSDD module 24 utilizes Kernel Pipe Interface 20 to provide communication between the kernel 24 and CPSSDD interface 16. CPSSDD interface provides an additional communications interface between the kernel 22 and ESSSNI agent 14. ESSNI 14 then provides communication using TCP/IP communication link 42 to HMC 44 and NI server 46. As one of ordinary skill in the art will appreciate, HMC 44 includes a number of communication ports/sockets to facilitate the TCP/IP communication 42 and 48 through the NI server 46 to the KM 50. To this regard, HMC 44 is adapted for opening and closing a particular communication socket pursuant to such a request. This process will be further described following. In the depicted embodiment, ESSNI 14 is designated to be an event receiver. In other words, the ESSNI 14 receives an event (herein also described as a call, communication request, data request, etc.) from the CPSSDD module 24 in kernel 22.

One of ordinary skill in the art will appreciate that variations to the depicted configuration of storage server 12, HMC 44 and KM 50 may be implemented. For example, in many configurations of storage servers 12, additional servers 12, HMCs 44 and associated KMs 50 may be connected across TCP/IP communication paths to provide for redundancy and the like. Accordingly, the mechanisms of the present invention are contemplated to apply to configurations of one or several HMCs connected to one or several KMs across a possible number of communications paths.

Figure 2:
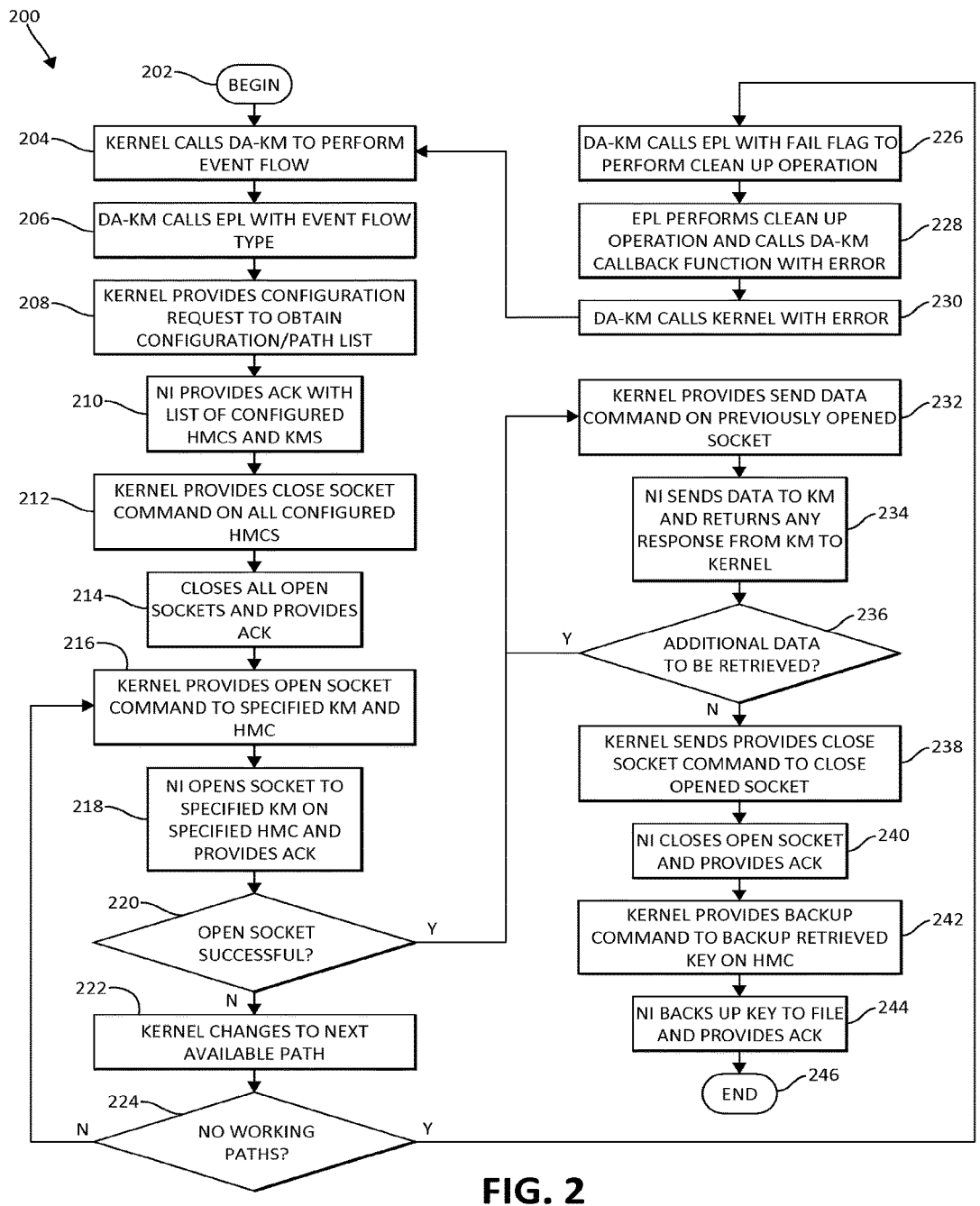
FIG. 2 is a flow chart diagram of an exemplary event flow according to various aspects of the present invention.

Turning now to FIG. 2, an exemplary method 200 for providing kernel-based communication between the kernel and an associated KM in a particular storage configuration is depicted. Method 200 begins (step 202) with a function call from the kernel to the KM to perform the event flow (step 204). This function call is initiated by the kernel in response to certain conditions, such as a startup condition in which affiliated storage devices necessitate encryption information (such as the aforementioned session key information) in order to function. Pursuant to the call from the kernel, the KM begins execution of the event flow by performing a function call to an EPL library to retrieve protocol information relating to the event flow type (step 206).

The kernel then provides a configuration request to the NI to obtain a list of all HMCs and KM configured within a particular storage complex (i.e., those storage components affiliated with the kernel in a particular configuration) (step 208). In response, the NI provides an acknowledgement with a list of all configured HMCs and KMs (step 210).

Once the particular storage configuration is ascertained, the kernel provides a communication command to close all open communications sockets on all configured HMCs (step 212). This may be due, in part, to a previous event flow that may have failed warranting a clean up process to be further described. In response, the NI closes all open sockets and provides an acknowledgement (step 214). The kernel prepares to specifically contact the KM by providing an additional communications command ("open socket") to a specified KM through a particular HMC in the storage complex (step 216). In response, the NI opens the socket to the particular KM on the specified HMC, and provides an acknowledgement (step 218).

If the acknowledgement received from the HMC indicates that the open socket operation was a success (step 220), then the method 200 proceeds to step 232 as will be described below. If this is not the case, then the kernel changes to the next available TCP/IP communication path (step 222) and retries providing the open socket command (again, step 216) where the NI opens the socket and again provides a return acknowledgment (again, step 218). If no working paths are identified (step 224), then the KM calls the EPL library with a failure flag to initiate performance of a clean up operation (step 226). The EPL library performs the clean up operation and calls the KM callback function with an error (step 228). The KM then calls the kernel with this error (step 230), and the method 200 returns to step 204.

If the open socket is successful as previously described, the method 200 proceeds to step 232, where the kernel provides a send data command on the previously opened socket. In response, the NI sends data, including data payload information (which may contain session key information or other payload information pursuant to the event suborder type selected by the kernel) from the KM through the NI/HMC to the kernel (step 234). If additional data is to be received (step 236), in which additional send data requests are sent pursuant to additional event suborder types, then additional data information/data payload information is sent from the KM through the NI/HMC to the kernel (again, step 234). Once all of the relevant data is retrieved by the kernel from the KM, the kernel provides a close socket command to close the opened socket (step 238), and pursuant to the close socket request, the NI closes the open socket and provides an acknowledgement (step 240). The kernel then initiates providing a backup command to backup the retrieved key information on the HMC (step 242). The NI backs up the key information to a file, and provides an acknowledgement (step 244). The method 200 then ends (step 246).

Turning now to FIG. 3, exemplary code (using a C style struct) is provided illustrating an exemplary KM Event definition structure. As one of ordinary skill in the art will appreciate, the code structure includes a number of event attributes, including definitional structures for several identification values (e.g., HMC, EKM, exchange, unique id). These identification values allow for the network configuration of the storage server with various HMCs and KMs to be managed by the kernel with respect to which KM to send a particular event and through which HMC to reach the KM, etc. Below the definitional structures a payload code structure is defined to carry the encryption information (session key, other encryption information) requested by the kernel from the KM.

FIG. 3 also illustrates various event flow suborder types, which may be initiated and/or selected by the kernel pursuant to an event flow. For example, suborder 0x01 may be selected to perform a communication request to open a particular communication path with an EKM (open socket), while another suborder 0x05 initiates a backup request to store the key information on the HMC. One of ordinary skill in the art will appreciate that the KM event definitional structure and the event flow suborder types may vary according to a particular implementation. In various embodiments, the KM event definitional structure and suborder types allow a kernel-initiated communication and encryption support between the kernel and KM through a particular HMC as previously described.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of communication, using a processor device, between a kernel operational on a storage subsystem and a key manager (KM) through a hardware management console (HMC) to provide encryption support, comprising:
    pursuant to a data request by the kernel to the KM, sending data including a data payload by the KM to the kernel to provide encryption support, the data payload corresponding to an event flow suborder type selected by the kernel for an event flow; and
    if a test communication along the communication path is unsuccessful, closing the socket, and opening an additional socket of the HMC along an additional communication path between the KM and the kernel to provide the data request.

2. The method of claim 1, further including, pursuant to a communication request by the kernel to the HMC, opening a socket of the HMC along a communication path between the KM and the kernel according to an additional event flow suborder type selected by the kernel for the event flow; and
    previous to opening the socket, closing at least one of an open socket of the HMC pursuant to an additional communication request by the kernel to the HMC to perform a clean up operation.

3. The method of claim 1, further including, subsequent to the sending data, closing the socket.

4. The method of claim 1, wherein a network interface (NI) of the HMC facilitates transfer of the event request, communication request, and data request from the kernel to the KM without knowledge of the event flow.

5. The method of claim 1, further including, pursuant to a backup request by the kernel to the KM, backing up the data payload on the HMC.

6. The method of claim 1, wherein at least one of the HMC and the KM is selected by the kernel to send at least one of the event request, communication request, and data request of an available plurality of HMCs and KMs in the storage subsystem.

7. The method of claim 1, further including sending a configuration request to the KM to obtain a configuration list of the available plurality of HMCs and KMs in the storage subsystem.

8. A system for communication, using a processor device, between components of a storage subsystem to provide encryption support, comprising:
    the processor device,
    a kernel operational on the storage subsystem operable by the processor device,
    a key manager (KM) in communication with the kernel, and
    a hardware management console (HMC) in communication between the KM and the kernel, wherein the kernel:
        pursuant to a data request by the kernel to the KM, sends data including a data payload by the KM to the kernel to provide encryption support, the data payload corresponding to an event flow suborder type selected by the kernel for an event flow; and
        if a test communication along the communication path is unsuccessful, closes the socket, and opens an additional socket of the HMC along an additional communication path between the KM and the kernel to provide the data request.

9. The system of claim 8, wherein the kernel, pursuant to a communication request by the kernel to the HMC, opens a socket of the HMC along a communication path between the KM and the kernel according to an additional event flow suborder type selected by the kernel for the event flow; and
    previous to providing the communication request to open the socket, provides an additional communication request to close at least one of an open socket of the HMC to perform a clean up operation.

10. The system of claim 8, wherein the kernel, subsequent to data sent by the KM to the kernel, closes the socket.

11. The system of claim 8, further including a network interface (NI) operational on the HMC in communication with the kernel, wherein the NI facilitates transfer of the event request, communication request, and data request from the kernel to the KM without knowledge of the event flow.

12. The system of claim 8, wherein the kernel provides a backup request to the KM, wherein pursuant to the backup request the data payload is backed up on the HMC.

13. The system of claim 8, wherein the kernel selects at least one of the HMC and the KM to send at least one of the event request, communication request, and data request of an available plurality of HMCs and KMs in the storage subsystem.

14. The system of claim 8, wherein the kernel sends a configuration request to the KM to obtain a configuration list of the available plurality of HMCs and KMs in the storage subsystem.

15. A computer program product for communication between a kernel operational on a storage subsystem and a key manager (KM) through a hardware management console (HMC) to provide encryption support, the computer program product comprising a non-transitory computer-readable storage medium having computer-readable program code portions stored therein, the computer-readable program code portions comprising:
    an executable portion that, pursuant to a data request by the kernel to the KM, sends data including a data payload by the KM to the kernel to provide encryption support, the data payload corresponding to an event flow suborder type selected by the kernel for an event flow; and
    an executable portion that, if a test communication along the communication path is unsuccessful, closes the socket, and opens an additional socket of the HMC along an additional communication path between the KM and the kernel to perform the providing the data request.

16. The computer program product of claim 15, further including an executable portion that, pursuant to a communication request by the kernel to the HMC, opens a socket of the HMC along a communication path between the KM and the kernel according to an additional event flow suborder type selected by the kernel for the event flow; and an executable portion that, previous to providing the communication request to open the socket, provides an additional communication request to close at least one of an open socket of the HMC to perform a clean up operation.

17. The computer program product of claim 15, further including an executable portion that, subsequent to data sent by the KM to the kernel, closes the socket.

18. The computer program product of claim 15, further including an executable portion that facilitates transfer of the event request, communication request, and data request from the kernel to the KM without knowledge of the event flow by a network interface (NI) of the HMC.

19. The computer program product of claim 15, further including an executable portion that:

provides a backup request to the KM, wherein pursuant to the backup request the data payload is backed up on the HMC, and selects at least one of the HMC and the KM by the kernel to send at least one of the event request, communication request, and data request of an available plurality of HMCs and KMs in the storage subsystem.

20. The computer program product of claim 15, further including an executable portion that sends a configuration request to the KM to obtain a configuration list of the available plurality of HMCs and KMs in the storage subsystem.

21. A method of manufacturing a system for communication, using a processor device, between a kernel operational on a storage subsystem and a key manager (KM) between a hardware management console (HMC) to provide encryption support, comprising:

providing the kernel operable by the processor device, wherein the kernel:

pursuant to a data request by the kernel to the KM, sends data including a data payload by the KM to the kernel to provide encryption support, the data payload corresponding to an event flow suborder type selected by the kernel for an event flow; and if a test communication along the communication path is unsuccessful, closes the socket, and opens an additional socket of the HMC along an additional communication path between the KM and the kernel to perform the providing the data request.

22. The method of manufacture of claim 21, wherein the kernel, pursuant to a communication request by the kernel to the HMC, opens a socket of the HMC along a communication path between the KM and the kernel according to an additional event flow suborder type selected by the kernel for the event flow; and previous to providing the communication request to open the socket, provides an additional communication request to close at least one of an open socket of the HMC to perform a clean up operation.

23. The method of manufacture of claim 21, wherein the kernel, subsequent to data sent by the KM to the kernel, closes the socket.

24. The method of manufacture of claim 21, further including a network interface (NI) operational on the HMC in communication with the kernel, wherein the NI facilitates transfer of the event request, communication request, and data request from the kernel to the KM without knowledge of the event flow.

25. The method of manufacture of claim 21, wherein the kernel provides a backup request to the KM, wherein pursuant to the backup request the data payload is backed up on the HMC.

26. The method of manufacture of claim 21, wherein the kernel selects at least one of the HMC and the KM to send at least one of the event request, communication request, and data request of an available plurality of HMCs and KMs in the storage subsystem.

27. The method of manufacture of claim 21, wherein the kernel sends a configuration request to the KM to obtain a configuration list of the available plurality of HMCs and KMs in the storage subsystem.

* * * * *